United States Patent
Shi et al.

(10) Patent No.: US 7,738,709 B2
(45) Date of Patent: Jun. 15, 2010

(54) METHOD FOR IDENTIFYING MARKED CONTENT, SUCH AS BY USING A CLASS-WISE NON-PRINCIPAL COMPONENT APPROACH

(75) Inventors: Yun-Qing Shi, Millburn, NJ (US); Guorong Xuan, Shanghai (CN)

(73) Assignee: New Jersey Institute of Technology, Newark, NJ (US)

( * ) Notice: Subject to any disclaimer, the term of this patent is extended or adjusted under 35 U.S.C. 154(b) by 1076 days.

(21) Appl. No.: 11/418,820

(22) Filed: May 5, 2006

(65) Prior Publication Data
US 2007/0270978 A1    Nov. 22, 2007

(51) Int. Cl.
*G06K 9/62* (2006.01)
(52) U.S. Cl. .................. 382/224; 382/276; 382/100
(58) Field of Classification Search ............... 382/224, 382/248, 276, 100
See application file for complete search history.

(56) References Cited

U.S. PATENT DOCUMENTS 6,122,628 A * 9/2000 Castelli et al. ............. 707/5

OTHER PUBLICATIONS

Loog et al. "Linear Dimensionality" Reduction via Heteroscedastic Extension of LDA: The Chernoff Criterion. IEEE Transactions on Pattern Analysis and Machine Intelligence, vol. 26, No. 6, Jun. 2004, pp. 732-739.*
Quintiliano et al. "Detection of Streets based on KLT Using IKONOS Multispectral Images." 2nd GRSS/ISPRS Joint Workshop on Remote Sensing and Data Fusion over Urban Areas, May 22, 2003, pp. 186-190.*

* cited by examiner

*Primary Examiner*—Jon Chang
(74) *Attorney, Agent, or Firm*—Connolly Bove Lodge & Hutz LLP

(57) ABSTRACT

Briefly, in accordance with one embodiment, a method of identifying marked content is described. For example, although claimed subject matter is not limited in this respect, in one embodiment, a class-wise non-principal components approach may be employed.

42 Claims, 5 Drawing Sheets

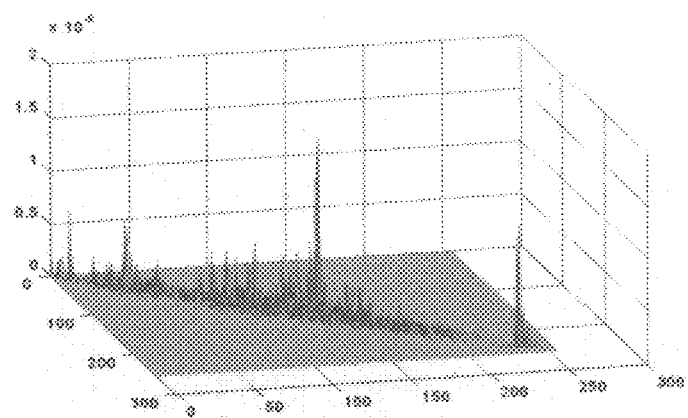
Figure 2. The distribution of square of energy difference.
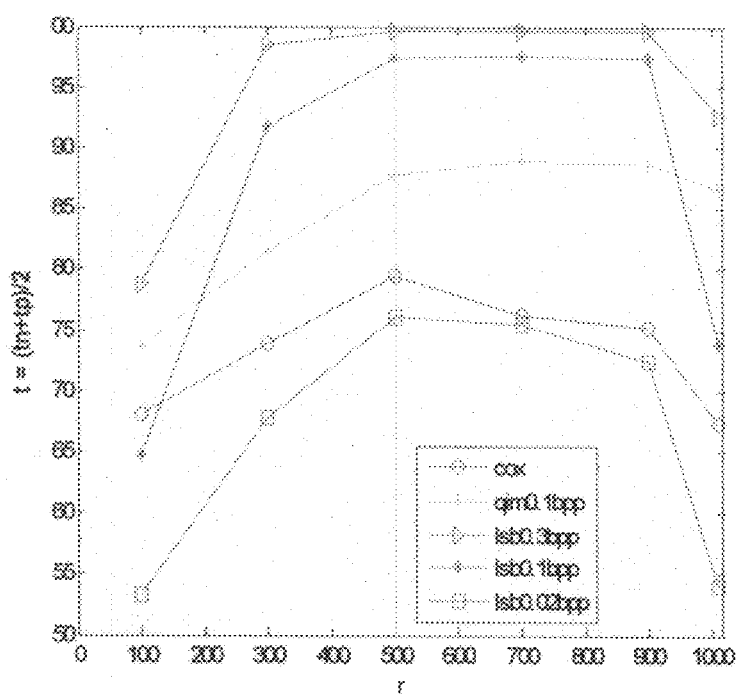
Figure 4

Table 1:
Detection Rate Comparison (%) (TN: true negative, TP: true positive; T=(TN+TP)/2).

|  |  | Cox | Qim | Lsb0.3 | Lsb0.1 | Lsb0.02 |
|---|---|---|---|---|---|---|
| Farid7 [1] | TN | 23.6 | 65.3 | 37.5 | 23.5 | 8.3 |
|  | TP | 89.1 | 92.8 | 91.1 | 89.7 | 92.7 |
|  | T | 56.3 | 79.1 | 64.3 | 56.6 | 50.5 |
| Sullivan et al. [2] | TN | 86.6 | 91.4 | 56.7 | 45.1 | 39.2 |
|  | TP | 64.9 | 90.0 | 74.7 | 62.3 | 56.9 |
|  | T | 75.7 | 90.7 | 65.7 | 53.7 | 48.1 |
| Ours (r=500) | TN | 76.7 | 78.4 | 99.4 | 96.9 | 72.7 |
|  | TP | 82.0 | 97.2 | 99.8 | 97.9 | 79.7 |
|  | T | 79.4 | 87.8 | 99.6 | 97.4 | 76.2 |
| Ours (r=900) | TN | 77.5 | 86.8 | 99.6 | 97.4 | 74.4 |
|  | TP | 72.6 | 89.7 | 99.6 | 96.2 | 70.3 |
|  | T | 75.0 | 88.3 | 99.6 | 96.8 | 72.3 |

Figure 6

METHOD FOR IDENTIFYING MARKED CONTENT, SUCH AS BY USING A CLASS-WISE NON-PRINCIPAL COMPONENT APPROACH

FIELD

This application is related to classifying or identifying content, such as marked content, for example.

BACKGROUND

In recent years, digital data hiding has become an active research field. Various kinds of data hiding methods have been proposed. Some methods aim at content protection, and/or authentication, while some aim at covert communication. The latter category of data hiding is referred to here as steganography.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and/or advantages thereof, may best be understood by reference of the following detailed description if read with the accompanying drawings in which:

FIG. 2 is a three-dimension plot of a distribution energy differences that have been squared;

FIG. 4 and FIG. 5 are plots comparing performances of various methods of classifying content;

FIG. 6 is a table comparing performance of various methods of classifying content;

DETAILED DESCRIPTION

Figure 1:
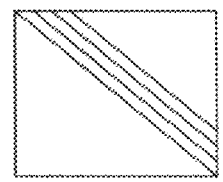
FIG. 1 is a schematic diagram illustrating an embodiment of a GLCM.

In the following detailed description, numerous specific details are set forth to provide a thorough understanding of claimed subject matter. However, it will be understood by those skilled in the art that claimed subject matter may be practiced without these specific details. In other instances, well known methods, procedures, components and/or circuits have not been described in detail so as not to obscure claimed subject matter.

Some portions of the detailed description which follow are presented in terms of algorithms and/or symbolic representations of operations on data bits and/or binary digital signals stored within a computing system, such as within a computer and/or computing system memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing may involve physical manipulations of physical quantities. Typically, although not necessarily, these quantities may take the form of electrical and/or magnetic signals capable of being stored, transferred, combined, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices.

In recent years, digital data hiding has become an active research field. Various kinds of data hiding methods have been proposed. Some methods aim at content protection, and/or authentication, while some aim at covert communication. The latter category of data hiding is referred to in this context as steganography. In this context, the term marked content refers to content in which data has been hidden so that it is not apparent that the content contains such hidden information. Likewise, unmarked or cover content refers to content in which data has not been hidden.

In J. Fridrich, M. Goijan and D. Hogea, "Steganalysis of JPEG Images: Breaking the F5 algorithm", 5th Information Hiding Workshop, 2002, pp. 310-323, (hereinafter "Fridrich et al."), Fridrich et al. have shown that the number of zeros in a block DCT domain of a stego-image will increase if the F5 embedding method is applied to generate the stego-image. This feature may be used to determine whether hidden messages have been embedded with the F5 method in content, for example. There are other findings regarding steganalysis of particularly targeted data hiding methods. See, for example, J. Fridrich, M. Goljan and R. Du, "Detecting LSB steganography in color and gray-scale images", Magazine of IEEE Multimedia Special Issue on Security, October-November 2001, pp. 22-28; and R. Chandramouli and N. Memon, "Analysis of LSB based image steganography techniques", Proc. of ICIP 2001, Oct. 7-10, 2001.

In S. Lyu and H. Farid, "Detecting Hidden Messages Using Higher-Order Statistics and Support Vector Machines," 5th International Workshop on Information Hiding, Noordwijkerhout, The Netherlands, 2002 (hereinafter, "Lyu and Farid"), Lyu and Farid proposed a more general steganalysis method based at least in part on image high order statistics, derived from image decomposition with separable quadrature mirror filters. The wavelet high-frequency subbands' high order statistics are extracted as features for steganalysis in this approach. Likewise, this approach has been shown differentiate stego-images from cover images with a certain success rate. Data hiding methods addressed by this particular steganalysis primarily comprise least significant bit-plane (LSB) modification type steganographic tools.

In K. Sullivan, U. Madhow, S. Chandrasekaran, and B. S. Manjunath, "Steganalysis of Spread Spectrum Data Hiding Exploiting Cover Memory", SPIE2005, vol. 5681, pp38-46., (hereinafter, "Sullivan et al.") a steganalysis method based at least in part on a hidden Markov model is proposed. The empirical transition matrix of a test image is formed in such an approach. However, the size of the empirical transition matrix is large, e.g., 65536 elements for a gray level image with a bit depth of 8. Thus, the matrix is not used as features directly. The authors select several largest probabilities along the main diagonal together with their neighbors, and randomly select some other probabilities along the main diagonal as features. Unfortunately, some useful information might be ignored due at least in part to the random fashion of feature formulation. The data hiding methods addressed by Sullivan et al. related primarily to spread spectrum (SS) data hiding methods. Although these latter methods may not carry as much information bits as LSB methods in general, SS methods may be used in connection with covert communications, for example. In addition, SS methods are known to be more robust than LSB methods.

For classification, as is known, an analysis of variance or other statistical approach may be applied, although, of course, claimed subject matter is not limited in scope in this respect. For example, an SVM process may be applied with both linear and non-linear kernels used for classification, although claimed subject matter is not limited in scope in this respect. In this context, the term "analysis of variance process" general refers to a process in which differences attributable to statistical variation are sufficiently distinguished from differences attributable to non-statistical variation that correlation, segmentation, analysis, classification and/or other characterization of the data based at least in part on such a process may be performed. Thus, mean square error, for example, and other approaches designed to reduce variation or differences among a set of samples or the like are included.

While the term steganalysis may have a variety of meanings, for the purpose of this particular embodiment, it refers to a two-class pattern classification approach. For example, a test image may be classified as either a cover or unmarked image, meaning information is not hidden in it, or a stego-image or marked image, which carries hidden data or hidden messages. In steganalysis, for example, it is desirable to have a feature contain information about changes incurred by data hiding as opposed to information about the content of the image. Of course, other approaches are possible and are included within the scope of claimed subject matter.

Generally speaking, however, unmarked images, for example, may tend to exhibit particular properties, such as continuous, smooth, and/or having a correlation between neighboring pixels. Likewise, hidden data may be independent of the content itself. A watermarking process, for example, may change continuity with respect to the unmarked content because it may introduce some amount of random variation, for example. As a result, it may reduce correlation among adjacent pixels, bit-planes and/or image blocks, for example. In this particular embodiment, it would be desirable if this potential variation that may be attributed to data hiding were capable of being amplified. This may be accomplished by anyone of a number of possible approaches and claimed subject matter is not limited in scope to a particular approach. However, below, one particular embodiment for accomplishing this is described.

Although claimed subject matter is not limited in scope in this respect, for this particular embodiment, a steganalysis scheme based at least in part on high-dimensional features of a gray-level co-occurrence matrix (GLCM) may be employed. In this scheme, high-dimensional features are evaluated using information of a GLCM to capture changes before and after data embedding. In this particular embodiment, a class-wise non-principal component approach (CNPCA) may be applied in a high-dimensional space, although, again, claimed subject matter is not limited in scope in this respect.

For this particular embodiment, a GLCM refers to a matrix of probabilities between gray-levels of different spatial positions in an image. The GLCM of a "natural" image tends to be diagonally distributed at least in part because the gray-levels of neighbor pixels in natural images may be highly correlated, while gray-levels around the main diagonal of a GLCM spread after the data embedding process in that the original correlations between the pixels are disturbed.

For this particular embodiment, parameters of GLCM are chosen as follows, although this is merely one example for purposes of illustration. Therefore, claimed subject matter is intended to include parameters other than those from this example. Gray-levels are 0-255 for 8-bit gray-level images. For this example, GLCM offset d is set to 1, although, again, this is merely an example. In this example, nearby neighborhoods, offset by 1, are therefore considered.

In this example, four different directions are selected for GLCM calculation, $\theta=0°, 45°, 90°$ and $135°$. Again, alternate embodiments may include other directions. However, for such an embodiment, we obtain 4 GLCM: $G_1, G_2, G_3, G_4$, for these four different directions, respectively. Let, for example, $$G=\text{normal } (G_1+G_2+G_3+G_4)$$

Here, operator normal represents average and normalization.

For this particular embodiment, examples of high-dimensional features include elements of the main diagonal and its neighbor diagonals of the GLCM, as shown in FIG. 1. If the image size is large enough and the pixel gray-levels are substantially uniformly distributed, GLCM G is approximately a symmetric matrix. Therefore, for this particular embodiment, we may employ elements of the main diagonal and parts of the upper triangle of the matrix to construct a feature vector, although claimed subject matter is not limited in scope in this respect.

For this example, we use 1018-dimensional feature vectors, although, again, claimed subject matter is not limited in this respect. Statistically, the energy of the selected elements is about 50-70% of the whole upper triangle of the GLCM. The selected feature vector, therefore, keeps a reasonable portion of the information of the GLCM and may be employed to capture changes from the data embedding process.

Let $G_{ori}$ denote the GLCM of the original image and $G_{steg}$ denote the GLCM of the stego image. Thus, $(G_{ori}-G_{steg})^2$ describes the energy differences between them, which is shown in FIG. 2. As shown in FIG. 2, the energy difference concentrates around the main diagonal of GLCM.

If, for this particular embodiment, we adopt a Euclidean distance based Bayes classifier to classify the 1018-dimensional feature vectors, it would be difficult to calculate the inverted covariance matrix $\Sigma^{-1}$ due at least in part to high dimensionality. Therefore, for this particular embodiment, we apply a class-wise non-principal components approach or method, although, claimed subject matter is not limited in scope in this respect.

In this particular context, a class-wise non-principal components approach (CNPCA for short) refers to classifying samples based at least in part on Euclidean distances between the samples and a mean vector of a class in the space or subspace spanned by eigenvectors associated with smaller eigenvalues of the class.

Figure 7:
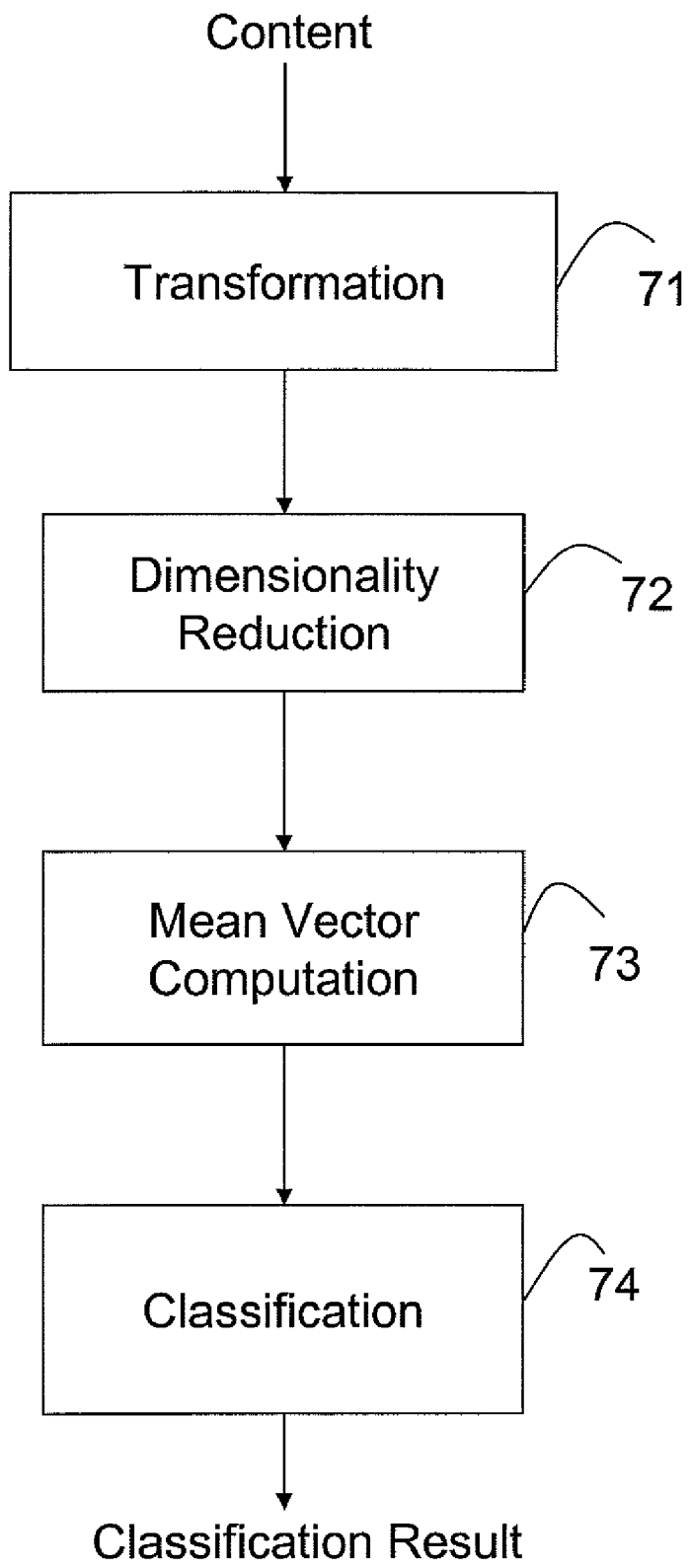
FIG. 7 is a diagram showing various embodiments of the invention.

For this embodiment, therefore, CNPCA may be employed as a classification method that applies dimension reduction. FIG. 7 is a diagram that may be used to illustrate, for example, this embodiment. For this particular embodiment, eigenvectors may be chosen corresponding to relatively small eigenvalues through a transformation of a class 71, such as, in this embodiment a Karhunen-Loeve transformation. For example, let A be an n-dimensional sorted diagonal eigenvalue matrix of a class. A corresponding n-dimensional eigenvector matrix, therefore, may be expressed as:

$$\Phi_k = (\Phi_k)_{n \times n} = [\Phi_{rk}, \Psi_{rk}]_{n \times n}$$

where r (0<r<n) denotes dimensionality of the eigenvectors $\Phi_{rk}$, which is associated with r larger eigenvalues. Thus, for a k-class classification, the Euclidean distance in an n-r subspace which is spanned by n-r eigenvectors associated with n-r smaller eigenvalues may be expressed as:

$$D_{rk} = \|\Psi'_{rk}(x - M_k)\|.$$

The distance, $D_{rk}$, is referred to, in this context, as the CNIPCA distance. An embodiment of a classification method in accordance with claimed subject matter that utilizes CNPCA distance as a criterion at least in part is referred to in this context as a CNPCA classification. For a specific database, for example, dimensionality r may be selected in such a way so that classification error is reduced relative to other potential dimensionalities.

An embodiment of a method of training a content classification process is described below, although, again, claimed subject matter is not limited in scope to this particular embodiment. Selected or training content may be processed as follows. One or more classes of selected or training content may be transformed 71 so that dimensionality reduction 72 may be applied. Dimensionality for the one or more classes may be reduced 72 by omitting those dimensions that have small eigenvectors on a relative basis. The mean vector of the one or more classes having reduced dimensionality may also be computed 73.

In more specific terms, without intending to limit the scope of claimed subject matter, one may take a transform, in this embodiment a K-L transform, of the classes for the training samples. One may also determine the n-r eigenvectors associated with the n-r eigenvalues that are small on a relative basis. Therefore, one may produce a dimension reduction matrix, $\Phi_{rk}$, for the classes by omitting dimensions that correspond to the selected eigenvectors. The mean vector of the classes, $M_k$, may also be calculated.

Although claimed subject matter is not limited in scope in this respect, a method of classifying content may include the following. For a content sample to be classified, Euclidean distance for the sample, in a subspace spanned by selected Eigenvectors, from a mean vector of the subspace may be determined, for particular classes. The content sample may then be classified 74 from among the particular classes so as to reduce the Euclidean distance in comparison with alternate classifications.

In more specific terms, without intending to limit the scope of claimed subject matter, for testing a content sample x, the following expression for the CNPCA distance between the sample and the mean vector for particular classes, $D_{rk}$, may be calculated.

$$D_{rk} = \|\Psi'_{rk}(x - M_k)\| = (x - M_k)\Psi_{rk}\Psi'_{rk}(x - M_k)$$

The sample x may be classified to the class so as to reduce $D_{rk}$ in comparison with alternate classifications.

Figure 3:
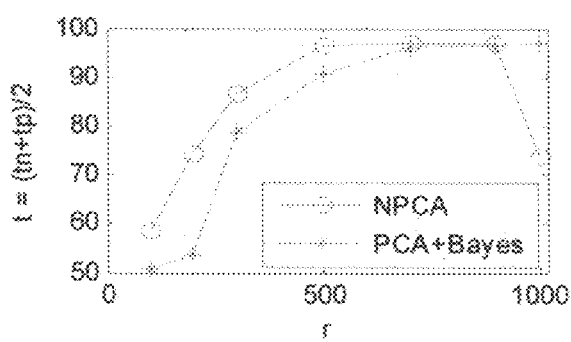
FIG. 3 is a plot comparing performance of a CNPCA classifier with a Bayes classifier.

The concept of CNPCA classification is distinct from that of conventional principal component analysis (PCA) classification. While a CNPCA method or approach utilizes "within-class" information in a class effectively, PCA is a dimension reduction method for a whole set which averages "within-class" distribution of a class. To illustrate this, compare the performance of the previously described embodiment of a CNPCA classifier with that of a PCA dimension reduction followed by a Bayes classifier, as illustrated in FIG. 3.

As illustrated by the plot, if samples scatter within classes and cluster between classes, PCA may not perform well. On the other side, CNPCA is suitable to address scattering within classes and clustering between classes. Image steganalysis is typically a two-class ("stego-image" and "non-stego-image") classification problem in which samples scatter within classes and cluster between classes. Content of an image database may be diverse, for example. The samples, therefore, may scatter within classes. Likewise, the embedding process is intended to be "invisible" to the casual observer. Therefore, the embedded data should be small, which may result in sample cluster between classes. An embodiment in accordance with claimed subject matter, such as, here, CNPCA, for example, may reduce or remove principal components while substantially maintaining non-principal components. An advantage of such an approach may be, from the GLCM, to select features which may be relatively more sensitive to "embedding" than to "the image content itself."

Having formulated an embodiment system for identifying or classifying marked content, such as images, for example, it is desirable to construct and evaluate performance. However, again, we note that this is merely a particular embodiment for purposes of illustration and claimed subject matter is not limited in scope to this particular embodiment or approach.

Of course, a variety of techniques are available to analyze data in a variety of contexts. In this context, we use the term "analysis of variance process" to refer to processes or techniques that may be applied so that differences attributable to statistical variation are sufficiently distinguished from differences attributable to non-statistical variation to correlate, segment, classify, analyze or otherwise characterize the data based at least in part on application of such processes or techniques. Examples, without intending to limit the scope of claimed subject matter includes: artificial intelligence techniques and processes; neutral networks; genetic processes; heuristics; and support vector machines (SVM).

Figure 5:
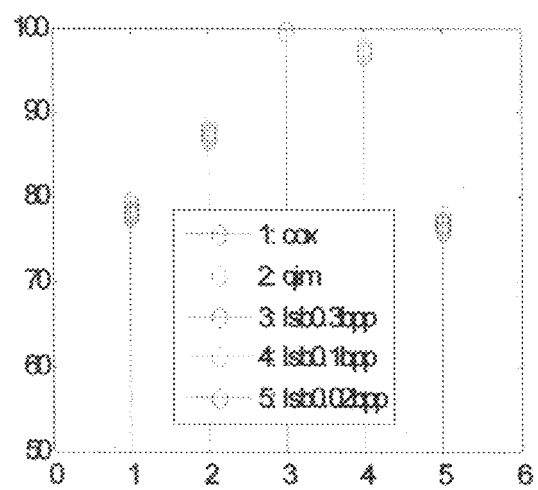

For this example, steganalysis was conducted with two different image databases. A hybrid image database was constructed that included 3908 images, in which 1096 images were from CorelDraw (www.corel.com) and the other 2812 images were from UCSB (vision.ece.ucsb.edu/~Sullivan/Research imgs/). Half of the images, 1954, were selected as training samples with the other half being selected as testing samples. Three embedding methods, Cox, QIM, and LSB, were used and the embedding rates were set to 0.3 bpp, 0.1 bpp and 0.02 bpp. Results are shown in FIG. 4 and FIG. 5. FIG. 4 is a plot and FIG. 5 is a table, here Table 1.

Table 1 illustrates a performance comparison between the embodiment previously described, in this example with r=500 and r=900, and the steganalysis methods proposed by Farid and Sullivan, as alluded to previously. The detection rates shown in Table 1 are the average results of 10 tests in which the training and testing samples were randomly selected for each test.

It is noted that, for the embodiment previously described, the detection rate t appears from these results to be a function of non-principal components dimensionality n-r. As shown in FIG. 4, the detection rates appear to achieve their peak values if r is around 500—at this point, the dimensionality of the non-principal components is 1018−500=518. Peak values remain almost constant until r=900. At this point, the dimensionality of the non-principal components is 1018−900=118.

To verify the stability of the detection rate, repetition was employed. As was mentioned, for ten tests, images were randomly selected. Again, half of the 3908 images were randomly selected as the training set with the other half selected as the testing set. Results in which r is set to 500 are shown in FIG. 5. As illustrated in FIG. 5, detection rates appear stable for different training and testing sets.

As indicated previously, these are merely examples for a particular embodiment and claimed subject matter is not limited in scope in this respect. Nonetheless, the 1018-dimensional feature vector extracted from GLCM appears to capture most of the changes before and after data embedding. Likewise, this particular embodiment of a classification technique based at least in part on CNPCA, appears to effective utilize "within-class" distribution information. It has shown good performance for situations in which samples scatter within classes and cluster between classes. Meanwhile, computational complexity is relatively low. Likewise, selection of dimensionality may affect results. However, results are robust in that similar performance occurs for a relatively wide range of r.

Figure 8:
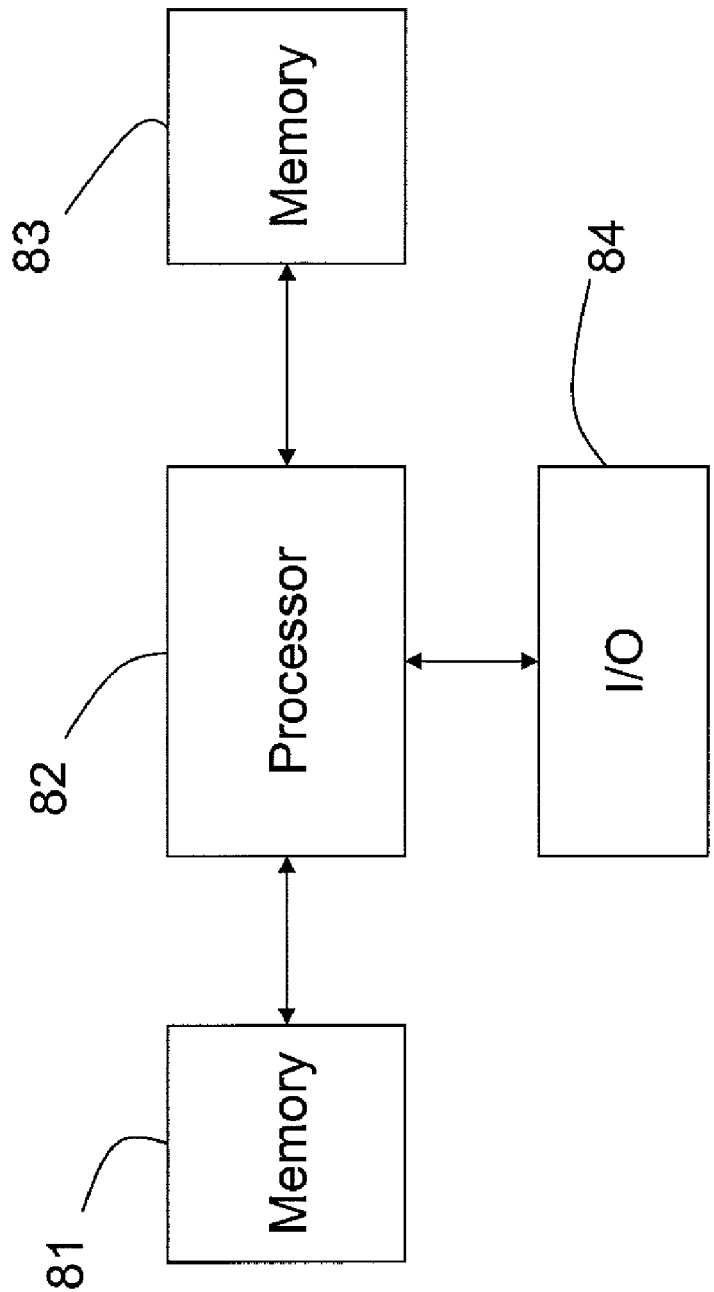
FIG. 8 is a diagram showing a system that may pertain to various embodiments of the invention.

It will, of course, be understood that, although particular embodiments have just been described, claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that if executed by a system, such as a computer system, computing platform, or other system, for example, may result in an embodiment of a method in accordance with claimed subject matter being executed, such as one of the embodiments previously described, for example. An exemplary system that may be used in one or more embodiments of the invention is shown in FIG. 8. As one potential example, a computing platform may include one or more processing units or processors 82, one or more input/output devices 84, such as a display, a keyboard and/or a mouse, and/or one or more memories 81, 83, such as static random access memory, dynamic random access memory, flash memory, and/or a hard drive.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A method of processing content, comprising:
   transforming one or more classes of at least a subset of the content to facilitate dimensionality reduction;
   reducing dimensionality, in one or more computing devices, for the one or more classes by omitting those dimensions that have small eigenvectors on a relative basis;
   computing one or more respective mean vectors based on the at least a subset of the content and corresponding to the one or more classes having reduced dimensionality; and
   providing the one or more mean vectors to a classifier.

2. The method of claim 1, wherein said content comprises images.

3. The method of claim 1, wherein said transforming classes of the at least a subset of the content comprises Karhunen-Loeve transforming classes of the at least a subset of the content.

4. The method of claim 1, wherein each of the classes of the at least a subset of the content is transformed.

5. The method of claim 4, wherein the number of classes comprises two.

6. The method of claim 1, wherein said reducing dimensionality comprises omitting a selected number of dimensions having the smallest eigenvalues.

7. The method of claim 1, wherein said reducing dimensionality comprises selecting a number of dimensions so that classification error is reduced.

8. The method of claim 1, wherein the content is of unknown classification, and wherein the classifier has been trained for classifying content of unknown classification among the one or more classes.

9. The method of claim 8, wherein providing the one or more mean vectors comprises determining at least one Euclidean distance in comparison with the one or more mean vectors corresponding to one or more classes, wherein the Euclidean distance comprises the class-wise non-principal components approach (CNPCA) distance.

10. The method of claim 8, wherein said content comprises an image.

11. The method of claim 8, wherein the particular classes comprise marked content and unmarked content.

12. The method of claim 8, wherein the subspace dimensionality is chosen so as to reduce classification error.

13. The method of claim 1, wherein the content corresponds to content known a priori to be marked or unmarked.

14. The method of claim 1, wherein the content is training data, and wherein providing the one or more mean vectors to the classifier comprises training the classifier.

15. The method of claim 14, wherein training the classifier is based on Euclidean distances between vectors.

16. An article comprising:
   a storage medium having stored thereon instructions that, upon execution by a computing device, result in performance, by the computing device, of operations comprising:
   transforming one or more classes of at least a subset of content to facilitate dimensionality reduction;
   reducing dimensionality for the one or more classes by omitting those dimensions that have small eigenvectors on a relative basis;
   computing one or more respective mean vectors based on the at least a subset of the content and corresponding to the one or more classes having reduced dimensionality; and
   providing the one or more mean vectors to a classifier.

17. The article of claim 16, wherein said content comprises images.

18. The article of claim 16, wherein said instructions, upon execution, further result in said transforming classes of the at least a subset of the content comprising Karhunen-Loeve transforming classes of the at least a subset of the content.

19. The article of claim 16, wherein said instructions, upon execution, further result in said reducing dimensionality comprising omitting a selected number of dimensions having the smallest eigenvalues.

20. The article of claim 16, wherein said instructions, upon execution, further result in said reducing dimensionality comprising selecting a number of dimensions so that classification error is reduced.

21. The article of claim 16, wherein the content is of unknown classification, and wherein the classifier has been trained for classifying content of unknown classification among the one or more classes.

22. The article of claim 21, wherein providing the one or more mean vectors comprises determining at least one Euclidean distance in comparison with the one or more mean vectors corresponding to one or more classes, wherein the Euclidean distance comprises the class-wise non-principal components approach (CNPCA) distance.

23. The article of claim 21, wherein said content comprises an image.

24. The article of claim 21, wherein said instructions, upon execution, further result in the particular classes comprising marked content and unmarked content.

25. The article of claim 21, wherein said instructions, upon execution, further result in the subspace dimensionality being chosen so as to reduce classification error.

26. The article of claim 16, wherein the content corresponds to content known a priori to be marked or unmarked.

27. The article of claim 16, wherein the content is training data, and wherein providing the one or more mean vectors to the classifier comprises training the classifier.

28. The article of claim 27, wherein providing the one or more mean vectors comprises determining at least one Euclidean distance in comparison with the one or more mean vectors corresponding to one or more classes.

29. An apparatus comprising:
    means for transforming one or more classes of content so that dimensionality reduction may be applied;
    means for reducing dimensionality for the one or more classes by omitting those dimensions that have small eigenvectors on a relative basis; and
    means for computing one or more mean vectors based on at least a subset of the content and corresponding to the one or more classes having reduced dimensionality.

30. The apparatus of claim 29, wherein said content comprises images.

31. The apparatus of claim 29, wherein said means for transforming one or more classes of the content comprises means for Karhunen-Loeve transforming one or more classes of the content.

32. The apparatus of claim 29, further comprising a content classifier configured to receive the one or more mean vectors of the one or more classes having reduced dimensionality.

33. The apparatus of claim 32, wherein the selected content corresponds to training data having known classification.

34. The apparatus of claim 33, wherein the classifier is configured to he trained by reducing a Euclidean distance between the one or more mean vectors of the one or more classes and one or more classification vectors known to correspond to a classification of the training data.

35. The apparatus of claim 34, wherein the Euclidean distance comprises the class-wise non-principal components approach (CNPCA) distance.

36. The apparatus of claim 32, wherein the content corresponds to data of unknown classification.

37. The apparatus of claim 36, wherein the classifier is configured to classify the data of unknown classification by reducing a Euclidean distance between the one or more mean vectors of the one or more classes and one or more classification vectors of the classifier.

38. The apparatus of claim 37, wherein the Euclidean distance comprises the class-wise non-principal components approach (CNPCA) distance.

39. The apparatus of claim 29, wherein the particular classes comprise marked content and unmarked content.

40. A computing system, comprising:
    at least one processor; and
    at least one storage device coupled to the at least one processor, the at least one storage device having stored thereon instructions that, upon execution by the at least one processor, result in performance of operations comprising:
    transforming one or more classes of at least a subset of content so that dimensionality reduction may be applied;
    reducing dimensionality for the one or more classes by omitting those dimensions that have small eigenvectors on a relative basis;
    computing one or more respective mean vectors based on the at least a subset of the content and corresponding to the one or more classes having reduced dimensionality; and
    providing the one or more mean vectors to a classifier.

41. The computing system of claim 40, wherein the content is of unknown classification.

42. The computing system of claim 40, wherein the content is training data, and wherein providing the one or more mean vectors to the classifier comprises training the classifier.

* * * * *